United States Patent
Campbell et al.

[15] 3,656,376
[45] Apr. 18, 1972

[54] FRICTION CLUTCH DEVICE

[72] Inventors: Theodore A. Campbell; Marlin R. Stebbins; Jonathan W. Peelle, all of Colorado Springs, Colo.

[73] Assignee: Rotoloc Corporation, Colorado Springs, Colo.

[22] Filed: Mar. 26, 1970

[21] Appl. No.: 22,887

[52] U.S. Cl. ............................................. 81/58, 192/80
[51] Int. Cl. ........................... B25b 13/00, F16d 11/06
[58] Field of Search ............... 81/58, 60, 125; 192/80, 79, 192/81

[56] References Cited

UNITED STATES PATENTS

| | | | |
|---|---|---|---|
| 2,824,476 | 2/1958 | Wilson | 81/58 |
| 2,735,324 | 2/1956 | Goldwater et al. | 81/60 |
| 3,253,626 | 5/1960 | Stillwagon et al. | 81/125 X |
| 2,766,648 | 10/1956 | Jazwieck | 81/58 |

*Primary Examiner*—James L. Jones, Jr.
*Attorney*—Bedell and Burgess

[57] ABSTRACT

A clutch device includes a cylindrical driven member surrounded by an annular driving member formed with a radial arm, the driving member being radially split along the axis of the arm. The arm extends into a cavity in an actuating member of the same width as the expanded arm whereby, by moving the actuating member to a position wherein the axis of the cavity is disaligned from the axis of the arm, the arm and the annular member will be compressed at their juncture to cause the annular member to frictionally grip the driven member. The clutch is embodied in a ratchet-action wrench in place of the usual ratchet mechanism in which the cylindrical drive member is a head rotatably mounted within an annular driving member or body formed with an elongated radial arm, and is radially split axially of the arm. The arm fits into an elongated axial cavity in the end of an elongated shank member, the width of the cavity being sufficient to accommodate the arm with the split open so that by moving the shank member to a position disaligned from the arm, the opposite side of the cavity will engage opposite ends of the arm, compressing the body to close the split and frictionally engage the head.

For retaining the arm in the shank cavity, the extremities of the expanded arm and the base of the cavity are wider than the mouth of the cavity, and for retaining the head in the body, both are formed with opposed annular grooves in which a split wire ring is seated.

15 Claims, 14 Drawing Figures

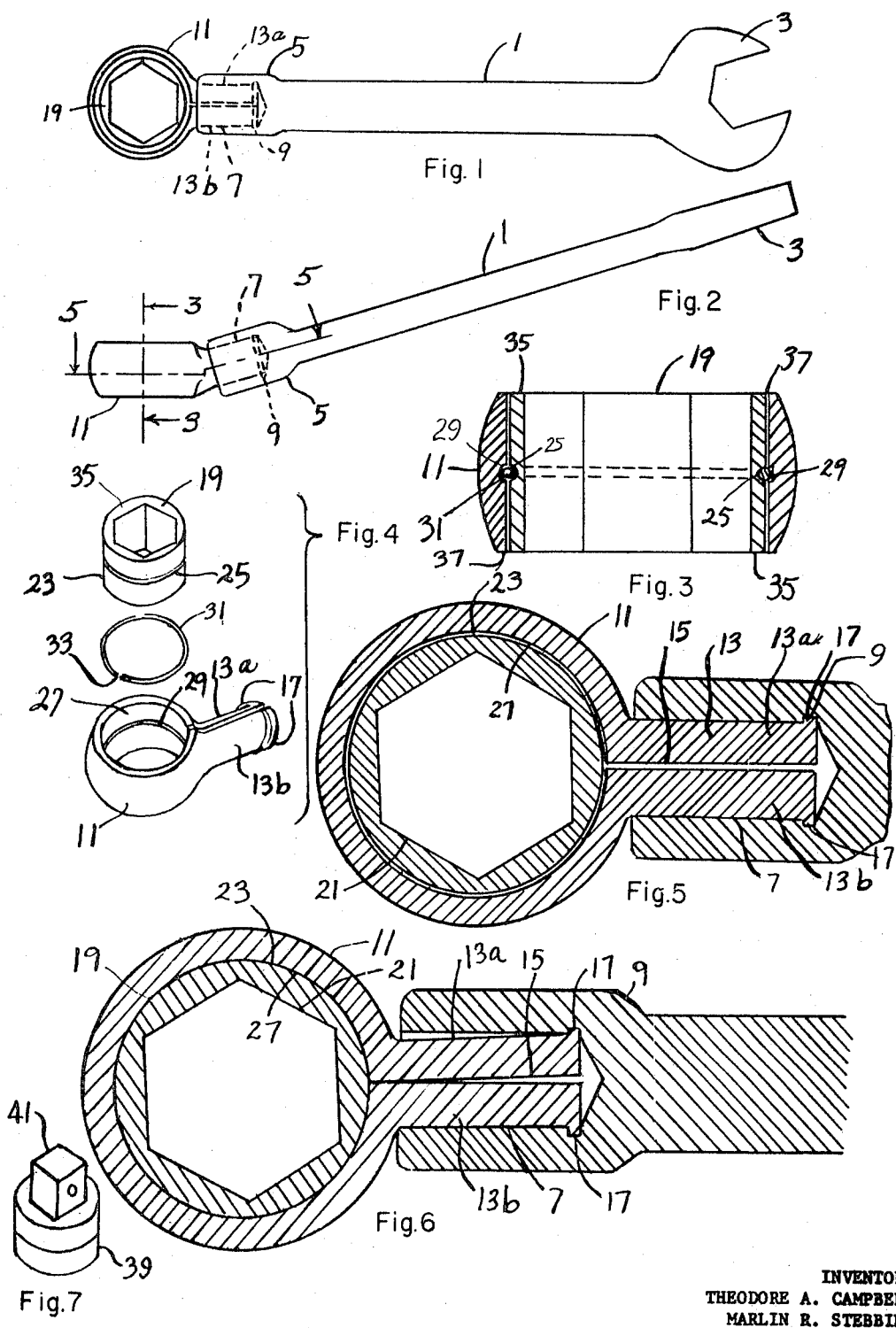

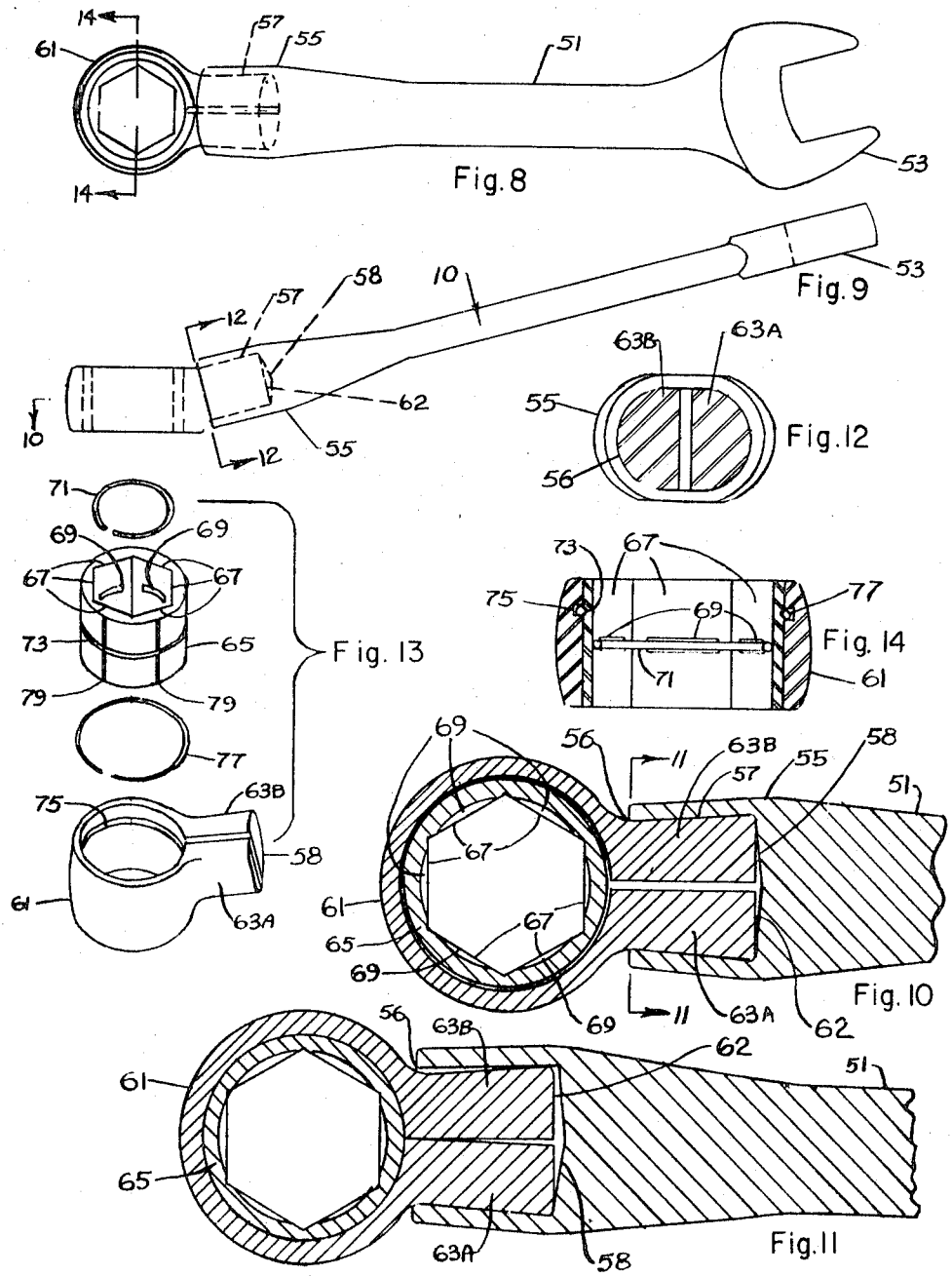

3,656,376

FRICTION CLUTCH DEVICE

BACKGROUND OF THE INVENTION

1. Field of the Invention

The invention relates to clutches and, more particularly, to wrenches having friction clutches providing ratchet-type action.

2. The Prior Art

Previously known friction actuated, ratchet-type wrenches have been provided with relatively complex means for compressing the ring into frictional gripping engagement with the wrench head or drum. On wrenches of this type, the ring was formed with a pair of radial jaws, one on each side of the split, one of the jaws being long and the other short, and near their ends the jaws were connected by pins to the shank at joints spaced apart lengthwise of the handle so that movement of the shank away from its normal position radial of the ring would cause the jaws to move toward each other, thus compressing the ring about the drum. In conventional ratchet wrenches also, changing the direction of rotation requires additional mechanism usually actuated by tripping of a lever or the like.

SUMMARY OF THE INVENTION

The invention provides an extremely simple friction clutch device incorporated in a ratchet-action wrench, in which the ratchet mechanism is replaced by the clutch between a driving member of annular shape and a cylindrical driver head, which may be formed with an aperture to engage bolts, nuts and the like of any configuration or with a square boss for use as a socket wrench. The wrench may be readily assembled or disassembled as desired but cannot come apart accidentally. No manually actuated reversing mechanism is required.

BRIEF DESCRIPTION OF THE DRAWINGS

FIG. 1 is a plan view of a wrench embodying the invention.

FIG. 2 is a side elevational view of the wrench illustrated in FIG. 1.

FIG. 3 is a transverse vertical sectional view of the wrench body and head taken along line 3—3 of FIG. 2.

FIG. 4 is a disassembled perspective view of the wrench body, head, and locking ring.

FIG. 5 is a horizontal sectional view along line 5—5 of FIG. 2, showing the shank, body, and head of the wrench in the inactive relation with each other.

FIG. 6 is a horizontal sectional view of the wrench taken along line 5—5 of FIG. 2, showing the parts in active, or gripping, position.

FIG. 7 is a perspective view of a socket-mounting head.

FIG. 8 is a plan view of a wrench embodying a modified form of the invention.

FIG. 9 is a side elevational view of the wrench illustrated in FIG. 8.

FIGS. 10 and 11 are generally horizontal sectional views taken along line 10—10 of FIG. 9 showing the wrench parts in released and gripping positions, respectively.

FIG. 12 is a transverse sectional view along line 12—12 of FIG. 9.

FIG. 13 is a disassembled perspective view of the wrench body, head and associated parts.

FIG. 14 is a transverse vertical sectional view of the body and head taken along line 14—14 of FIG. 8.

DESCRIPTION OF THE PREFERRED EMBODIMENTS

In the embodiment illustrated in FIGS. 1–6, the clutch device is embodied in a wrench which has an actuating member comprising an elongated metal shank 1, which may be formed at one end with a conventional open-end wrench head 3, and at its other end is thickened as at 5. The thickened portion 5 of shank 1 is formed with a cylindrical cavity 7, the sides of which are undercut a substantial distance inwardly from the cavity mouth to form an annular groove 9.

The wrench also includes an annular driving member or body 11 formed with a radial arm 13 of cylindrical cross section, and annular body 11 is radially split as at 15 along the axis of arm 13, dividing the latter into two axially split parts 13a and 13b. The uncompressed diameter of arm 13 is substantially the same as that of cavity 7 so that the arm is rotatably and slidably receivable within the cavity. The ends of arm halves 13a and 13b are formed with projecting ribs 17 which extend radially of the arm in opposite directions normal to the plane of split 15 and are of less than half the thickness of the split so that the arm can be inserted into the cavity by compressing it and sliding it inwardly, then permitting it to expand when ribs 17 are abreast of annular groove 9. When this occurs, as will be evident from the drawing, particularly FIG. 5, body 11 will be firmly secured to shank 1 but will be rotatable with respect thereto by reason of the cylindrical configuration of cavity 7 and mating arm 13.

The driven member of the clutch comprises cylindrical head 19 of slightly less diameter than the inside diameter of annular body 11. Head 19 may be formed with a central aperture 21 of hexagonal shape for engagement with a nut or bolt head of this shape. The outer cylindrical surface 23 of head 19 is formed with a central annular groove 25, and the inner cylindrical surface 27 of body 11 is formed with a similarly positioned annular groove 29. For locking head 19 within annular body 11, a wire ring 31, split as at 33, is fitted into head annular groove 25 and, with body 11 fully expanded, the head is inserted into the opening in body 11 until the flat transverse surfaces 35 of head 19 are flush with the transverse surfaces 37 of annular body 11. With this arrangement, when body 11 is sufficiently compressed for arm 13 to fit into cavity 7, ring 31, by engagement with the surfaces of grooves 25 and 29, will prevent relative movement of head 19 and body 11 axially of the body, thus locking the head within the body.

With the construction described, it will be evident that simple rotational movement of shank 1 in either direction about the axis of body 19 and head 11 will not produce any movement of head 19 so long as the axis of cavity 7 is aligned with the arm axis, as shown in FIG. 5.

For transmitting rotational movements of shank 1 and body 11 to head 19, the shank is shifted to a position wherein it is axially disaligned from the arm (FIG. 6) so that the outer margin of cavity 7 forces the adjacent portion of arm part 13b toward arm part 13a, thus correspondingly reducing the inside diameter of body 11 and bringing the latter into gripping frictional engagement with the outer surface of head 19. Continued movement of the shank while so positioned about the axis of the head will be frictionally transmitted to the head, causing it to turn. Upon release of shank 1 from its disaligned position, the elasticity of body 11 will cause it to expand, thus releasing its gripping frictional engagement with head 19 and permitting some desired return movement of shank 1 and body 11. When the shank returns to a convenient position for resuming operation, it can again be moved toward the disaligned position and the operation repeated as many times as desired in the same manner as with a conventional ratchet wrench.

The wrench may be used as a socket wrench by substitution of head 39 (FIG. 7) for hexagonally apertured head 19. Head 39 is formed with a square boss 41 for mating engagement with the mounting socket of a socket wrench.

In the embodiment illustrated in FIGS. 8–14, the construction of the wrench is generally similar to that of FIGS. 1–6, except for the shape of the tongue and cavity.

The wrench of FIGS. 8–11 has an elongated shank 51, with an open-end wrench head 53 at one end if desired, and its other end thickened as at 55. The thickened portion of shank 51 is formed with an axially-extending open-mouth cavity 57 of oval cross section, tapering from a minimum dimension along the major axis of its mouth 56 to a maximum dimension along the major axis of its base 58.

The wrench body 61 is generally similar to body 11 of the previous embodiment, except that the arm is also of oval cross section and its parts 63a, 63b do not have nibs at their ends such as ribs 17 of the previous embodiment but are slightly tapered lengthwise to a maximum dimension along the major axes of their extremities 62. Instead of relying on the cooperation of ribs 17 and annular groove 9 as in the previous embodiment, to retain arm 63a, 63b in cavity 57, this function is performed by the expansion of arm portions 63a and 63b into abutting engagement with the tapered sides of conical cavity 57, as best seen in FIG. 10. It will be evident from FIG. 10 that the slit dividing arm parts 63a and 63b is of sufficient width that when the arm parts are compressed toward each other, the major dimension of the arm extremity 62 will be reduced to less than the major dimension of mouth 56, to permit the insertion and removal of the arm into and out of the cavity.

The cylindrical head 65 differs slightly from head 23 of the previous embodiment. The faces 67 of its hexagonal aperture are formed with short arcuate annular grooves 69 midway between the open ends of the aperture, and a split wire ring 71 is resiliently seated in grooves 69 so that it protrudes slightly into the aperture at the annular corners thereof, whereby to engage the top of the head or nut of a hex-head bolt or nut on which the wrench may be used and thus prevent the wrench from slipping down past the head or nut onto the shank of the bolt or stud. The exterior annular groove 73 in head 65 and the interior annular groove in body 61 are offset axially of the head from grooves 69 to avoid weakening of the head in this region, and a second split ring 77 in internal groove 75 enters external groove 73 to prevent undesired axial movement of head 65 out of body 61. The external cylindrical surface of head 65 may also be formed with a plurality of circumferentially spaced axial grooves 79 to facilitate the discharge of oil or particles of matter between the opposing surfaces of head 65 and body 61 which might otherwise interfere with operation of the wrench.

As in the first embodiment, simple rotational movement of shank 51 in either direction about the axis of body 61 and head 65 will not produce any movement of head 65 so long as the axes of cavity 57 and of arm parts 63a, 63b are aligned with each other as in FIG. 10.

For transmitting rotational movements of shank 51 and body 61 to head 65, the shank is shifted to a position wherein it is axially disaligned from the arm, as best seen in FIG. 12, so that the outer margin of cavity 57 forces the adjacent portion of arm half 63b toward arm half 63a, thus correspondingly reducing the inside diameter of body 61 and bringing the latter into gripping frictional engagement with the outer surface of head 65. Continued movement of the shank while so positioned about the axis of the head will be frictionally transmitted to the head, causing it to turn. Upon release of shank 51 from its disaligned position, the elasticity of body 61 will cause it to expand, thus releasing its gripping frictional engagement with head 65 and permitting some desired return movement of shank 51 and body 61. When the shank returns to a convenient position for resuming operation, it can again be moved toward the disaligned position and the operation repeated as many times as desired in the same manner as with a conventional ratchet wrench.

It will be understood that in both embodiments the clutch device disclosed herein is not limited to application to wrenches but may be used wherever a similar clutch action is desired, and the exclusive use of all modifications as come within the scope of the appended claims is contemplated.

We claim:

1. A friction clutch device comprising an annular driving member formed with a radial arm, a cylindrical driven member rotatably positioned within the aperture of said driving member, said driving member and said arm being split radially of said driving member along the axis of said arm to provide two arm parts spaced apart circumferentially of said driving member, an actuating member formed with a cavity, the width of said cavity circumferentially of said driving member being sufficient to receive both said arm parts in spaced apart relation, both said arm parts fitting into said cavity whereby movement of said actuating member in either direction circumferentially of said driving member to positions in which the axis of said cavity is disaligned axially with respect to said arm parts causes their movement toward each other and frictional gripping by said driving member of said driven member and corresponding rotation of said driven member, and reverse movement of said actuating member to a position aligned with said arm permits said arm parts to return to their normal spaced relation permitting said driving member to release said driven member.

2. A friction clutch device according to claim 1 including means for locking said driven member within said driving member.

3. A friction clutch device according to claim 2 wherein said locking means comprises opposed annular grooves in the inner surface of said driving member and the outer cylindrical surface of said driven member, there being a ring positioned in said grooves to secure said driven member in said driving member.

4. A friction clutch device according to claim 2 wherein said locking means comprises an annular groove in the cylindrical surface of one of said driving and driven members and a mating circumferential rib protruding radially from the other of said driving and driven members.

5. A friction clutch device according to claim 4 wherein the cylindrical surface of the other of said driving and driven members is formed with an opposing annular groove, and a ring seated therein forms said annular rib.

6. A friction clutch device according to claim 1 wherein the sides of said cavity are undercut inwardly from its mouth, and said arm is formed with projections from its sides receivable in the undercut portion of said cavity when said arm is expanded to lock said arm in said cavity.

7. A friction clutch device according to claim 6 wherein said cavity is of circular cross section, and said undercut defines an annular groove spaced inwardly from the end of said actuating member, said arm being of similar cross section and said projections being of arcuate shape for mating engagement with said annular groove.

8. A friction clutch according to claim 1 wherein said cavity is wider at its base than at its mouth in a direction normal to the plane of the split through said arm, and said arm when expanded is similarly proportioned.

9. A friction clutch according to claim 8 wherein the cross sections of said cavity and said arm are elongated in a direction normal to the plane of the split through said arm.

10. A friction clutch according to claim 8 wherein opposite sides of said cavity generally parallel to said split are tapered outwardly from the axis of said cavity between the mouth and the base of said cavity.

11. A friction clutch device according to claim 1 wherein said actuating member is an elongated wrench shank, and said cavity is formed in one end of said shank.

12. A friction clutch device according to claim 11 wherein said driven member is formed with a polygonal aperture concentric with its axis.

13. A friction clutch device according to claim 12 wherein grooves are formed in the faces of said polygonal aperture and a resilient split ring is seated in said grooves with its arcuate portions between said grooves projecting into the aperture adjacent the angles thereof whereby to abuttingly engage the top of polygonal work elements received in said aperture.

14. A friction clutch device according to claim 11 wherein said driven member is provided with a polygonal boss on one of its faces normal to its axis.

15. A friction clutch according to claim 8 wherein said actuating member comprises an elongated wrench shank, the mouth of said cavity being located in one end surface of said shank and said cavity and shank axis being in substantial alignment with each other.

* * * * *